H. J. PARKER & J. R. BRADFORD.
DEMOUNTABLE RIM.
APPLICATION FILED SEPT. 13, 1915.
1,201,089.
Patented Oct. 10, 1916.
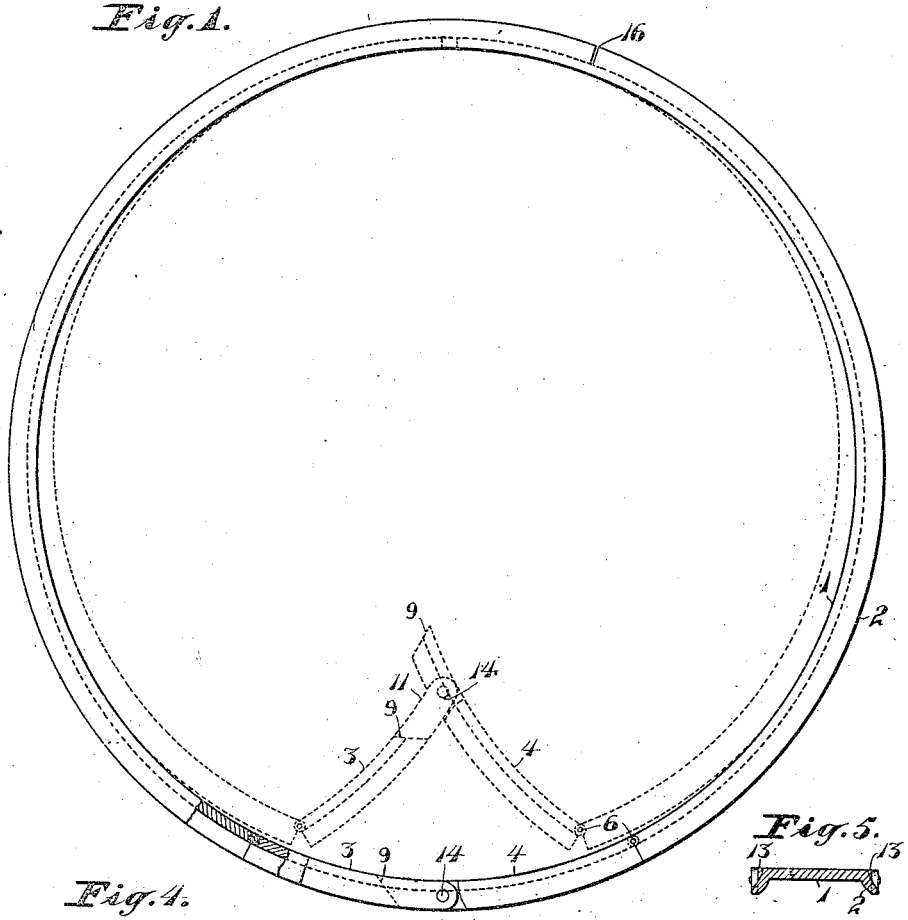
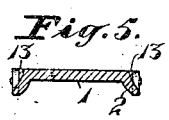
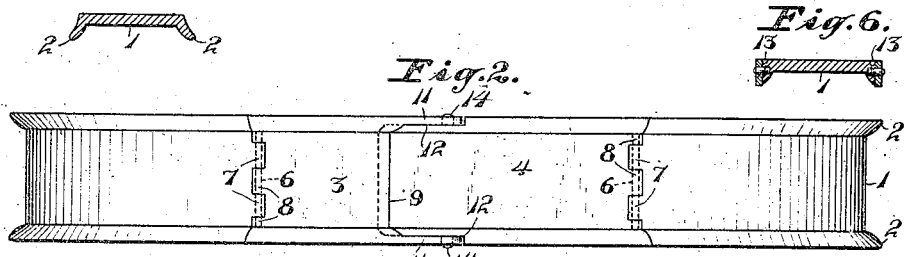
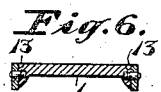
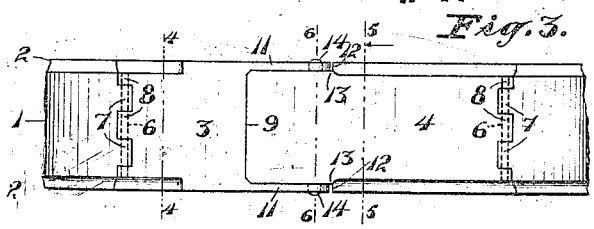
Inventors:-
Harry J. Parker,
James R. Bradford,
By J. M. Wright,
Attorney

UNITED STATES PATENT OFFICE.

HARRY J. PARKER AND JAMES R. BRADFORD, OF SAN FRANCISCO, CALIFORNIA, ASSIGNORS OF ONE-HALF TO LEONARD P. WOODBURY, OF BERKELEY, CALIFORNIA.

DEMOUNTABLE RIM.

1,201,089. Specification of Letters Patent. Patented Oct. 10, 1916.

Application filed September 13, 1915. Serial No. 50,365.

*To all whom it may concern:*

Be it known that we, HARRY J. PARKER and JAMES R. BRADFORD, citizens of the United States, and residing at San Francisco, in the county of San Francisco and State of California, have invented new and useful Improvements in Demountable Rims, of which the following is a specification.

The present invention relates to improvements in demountable rims for the wheels of vehicles, the object of the invention being to provide a rim of this character which, after being demounted from the wheel of the vehicle, can be readily collapsed so as to permit of the removal therefrom of the pneumatic tire in order to replace said tire by another tire, and can be as readily extended into its circular form to permit its replacement on the wheel.

In the accompanying drawing, Figure 1 is a broken side view of our improved demountable rim; Fig. 2 is a plan view of the same from the outside; Fig. 3 is a broken plan view of the same from the inside; Figs. 4, 5 and 6 are sectional views on the lines 4—4, 5—5 and 6—6 respectively of Fig. 1.

Referring to the drawing, 1 indicates a main rim section having flanges 2 extending obliquely outward. Instead of being continuous throughout its whole circumference we provide two toggle sections 3, 4, the outer ends of which are hinged to the main section of the rim in suitable manner. A convenient connection is provided by hinge pins 6, each passing through registering apertured lugs 7, 8 in the main and toggle sections respectively. Each section can thus swing inwardly only from the rim, any outward swinging movement being prevented by the abutment of the flanges of the toggle sections against corresponding flanges of the body of the rim. One of said toggle sections is longer than the other, and said sections are provided with beveled abutment surfaces 9, one of said surfaces being positioned at the extremity of the longer section, the surface 9 of the shorter section being located between the bars 11 of said section. The flanges 2 of the longer toggle section are cut away as indicated at 12, to provide clearance for the bars 11 which are pivotally attached to said longer toggle section, at 14, and the remainder of the terminal portions of the flanges are reinforced, as shown at 13, to furnish surfaces parallel with the plane of the wheel and adapted to lie in contact with the bars when the rim is in its normal position, the two sections being pivoted together by pivot pins 14, extending through said bars and reinforcements. These bars and reinforcements may be either integral with the rim, as shown, or secured thereto. It will be seen that the two sections thus pivoted together form, as it were, a toggle, which can be moved into the extended position, as shown in full lines in Fig. 1, to form a complete circle with the remainder of the rim, or can be bent inwardly, as shown in dotted lines in Fig. 1. In its latter form the rim will be considerably collapsed from its extended position, so that the tire can easily be removed therefrom. When said tire has been removed and a new tire replaced on the rim, the toggle can be again extended to form a complete ring with the rim, and the rim is ready for applying upon the felly of the wheel.

The flanges 2, of the main rim section 1, are cut through, as indicated at 16, the cuts extending entirely through the flanges, but not through the rim body, the metal of said rim body, adjacent said cuts being tempered to render the same springy or resilient at that point. The cuts 16 are made at a point spaced from the toggle sections. In practice the resilient portion possesses sufficient strength to normally resist collapse of the rim, when the toggle sections have been moved outwardly to complete the circular continuity of the rim, said resilient portion, however, permitting the main rim section to be slightly contracted when the toggle sections are moved inwardly.

When it is desired to place a tire upon the rim, if the toggle sections are in their outer position, the rim is rotated so as to bring the toggle sections at the bottom. Thereupon, by lifting the rim and dropping the same, the force of the impact will move the toggle sections inwardly, and the resilient portion adjacent the cuts 16 will permit the main rim section to slightly contract. The tire may then be easily slipped into position on the rim, after which the toggle sections may be moved outwardly by applying pressure to the free end of the section 4 by the foot of the operator. The tire may then be blown up and the pressure thereof will prevent collapse of the toggle sections by reason of the fact that the resilient portion adjacent the cuts 16 possesses sufficient strength to resist the tendency of collapse. When it is desired to remove the tire, the same is dropped in the manner above described, to break the joint at the toggle connection, whereupon the rim will then contract sufficiently to permit of ready removal of the tire.

The advantage of the invention will be readily apparent to those skilled in the art. It will be particularly noted that when the toggle sections are pressed outwardly to complete the circular continuity of the rim, the resilient portion adjacent the cuts 16, possesses sufficient stiffness and stability to prevent collapse of the rim under the strains to which it is normally subjected. A further advantage lies in the fact that the rim may be readily collapsed by applying sufficient extraneous force to move the connected ends of the toggle sections inwardly, whereupon the resiliency of the tempered portion adjacent cuts 16, will automatically force said inner ends of the toggle sections inwardly a sufficient distance to collapse the rim. Thus a tire may be applied to or removed from the rim by an unskilled person without the use of tools, and with the expenditure of a minimum of time and labor.

A portion 15 of the section 4 extended beyond the pivot 14 forms a lever, which can be grasped by the hand so that the two sections can be drawn inwardly, as shown in dotted lines in Fig. 1, and therefore the whole rim can be contracted, so as to be of smaller diameter than the inside of the tire, and therefore to be readily removable therefrom. Not only does this extension 15 serve as a lever to obtain increased power in contracting the rim, but it facilitates the expansion of the rim again in order to secure the tire thereon. This may be effected by pressing the foot upon said extension 15.

The particular construction of the pivot by which the two sections are pivoted together is very advantageous, first, because the bars 11 and the cut-away portions 12 of the flanges, fitting tightly against one another for a considerable distance, prevent the rim getting out of alinement at the portions adjacent to the pivots 14; second, said parts also reinforce and strengthen each other; and, third the bars 11 engaging the ends of the uncut portions of the flanges of the section 4, limit the inward movement of said sections 3 and 4, and thereby limit the extent to which it is possible to bend the rim at the point 16, and therefore prevent the rim from breaking at that point.

We claim:

1. A demountable rim comprising a main rim section, and toggle sections movably connected at their outer ends with the respective ends of said main section and having their inner ends movably connected with each other, whereby the connected ends of said toggle sections may move inwardly in the plane of the rim, the main rim section being provided with a localized resilient portion spaced from the toggle sections and acting to move both extremities of said main rim section inwardly to automatically force the connected ends of the toggle sections inwardly, after initiation of said inward movement by an extraneous force, said resilient portion possessing sufficient strength to normally resist collapse of the rim.

2. A demountable rim comprising a main rim section, and toggle sections movably connected respectively with the ends of the main section and also movably connected with each other, whereby said toggle sections may move inwardly in the plane of the rim, said main and toggle sections having side flanges, the flanges of the main section being slit at points spaced from the toggle sections, the body of said main section contiguous to said slit portions being tempered to provide a resilient portion to permit said main rim section to be slightly contracted when the toggle sections move inwardly, the said resilient portion possessing sufficient strength to normally resist collapse of the rim.

In testimony whereof we have hereunto set our hands in the presence of two subscribing witnesses.

HARRY J. PARKER.
JAMES R. BRADFORD.

Witnesses:
F. M. WRIGHT,
D. B. RICHARDS.